United States Patent [19]

Yokoi

[11] Patent Number: 5,145,263
[45] Date of Patent: Sep. 8, 1992

[54] BACKLASH ABSORBING SYSTEM FOR BEARINGS

[76] Inventor: Junichi Yokoi, 11-20 Wakae-honmachi 2-chome, Higashi-Osaka City, Osaka-Fu, Japan

[21] Appl. No.: 651,625

[22] Filed: Feb. 7, 1991

[51] Int. Cl.⁵ .................. F16C 27/02; F16C 25/04; F16C 33/10
[52] U.S. Cl. ................................ 384/219; 384/266; 384/397
[58] Field of Search .................. 384/192, 215–219, 384/247, 201, 263–270, 274, 295, 322, 397

[56] References Cited

U.S. PATENT DOCUMENTS

| | | | |
|---|---|---|---|
| 945,841 | 1/1910 | Evans | 384/269 |
| 1,444,628 | 2/1923 | Miller | 384/263 X |
| 1,588,138 | 6/1926 | Neilson, Sr. | 384/266 X |
| 1,650,629 | 11/1927 | Johnson | 384/216 |
| 1,664,880 | 4/1928 | Flintermann | 384/218 X |
| 2,367,613 | 1/1945 | Rich | 384/219 |
| 3,361,458 | 1/1968 | Herbenar | 384/266 X |
| 3,592,518 | 7/1971 | Pfister | 384/219 |

FOREIGN PATENT DOCUMENTS

| | | | |
|---|---|---|---|
| 480009 | 7/1929 | Fed. Rep. of Germany | 384/266 |
| 91150 | 12/1937 | Sweden | 384/266 |

*Primary Examiner*—Thomas R. Hannon
*Attorney, Agent, or Firm*—Wenderoth, Lind & Ponack

[57] ABSTRACT

A bearing system rotatably supporting a shaft or any other similar machine element is unrotatably fitted in a bearing inserting aperture. The bearing system comprises a fixed bushing which is located more adjacently than the shaft to a portion thereof on which external force acts, and is fixed within the bearing inserting aperture. A movable bushing cooperates with the fixed bushing to hold the shaft, and is allowed to advance or retreat relative to the fixed bushing. Springs allow the movable bushing to approach the fixed bushing. If the outer circumferential surface of the shaft and the inner peripheral surface of the fixed bushing are worn out or abraded, the movable bushing is moved in proportion to the wear or abrasion amounts of the shaft and the fixed bushing in the direction of the fixed bushing by using the springs. Therefore, the outer circumferential surface of the shaft and the inner peripheral surface of the bearing system are free from any backlash therebetween, and there is no disadvantage which would result from the backlash.

13 Claims, 12 Drawing Sheets

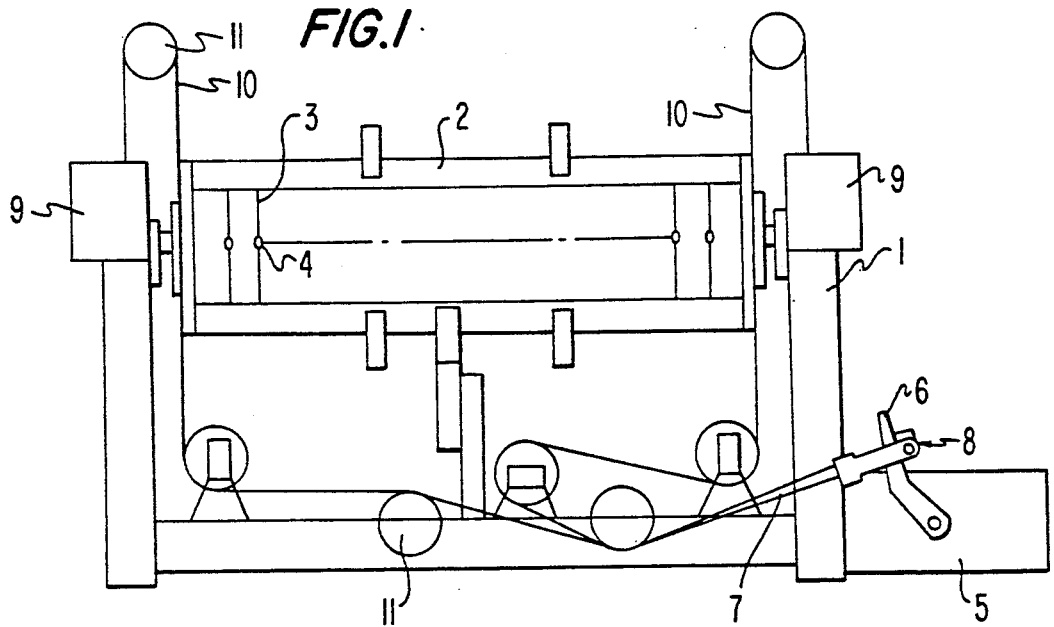
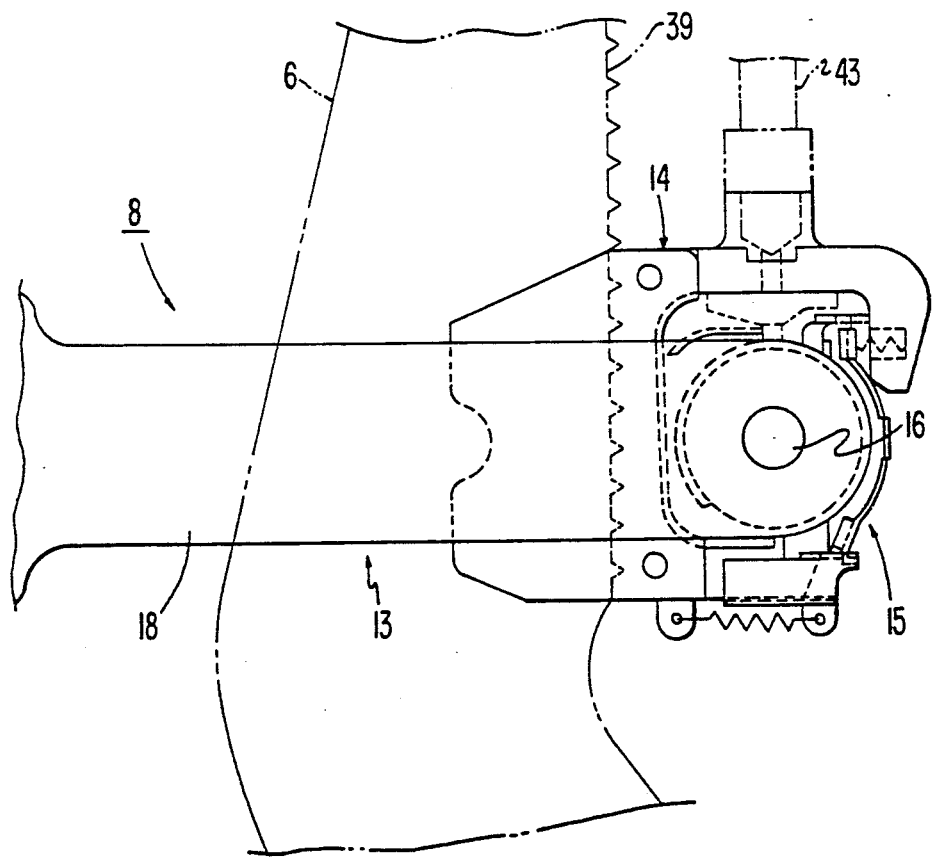

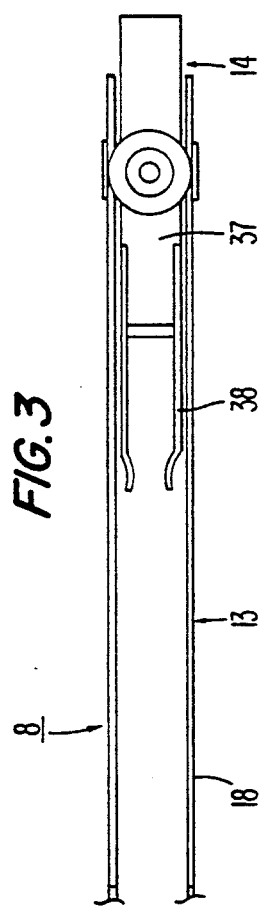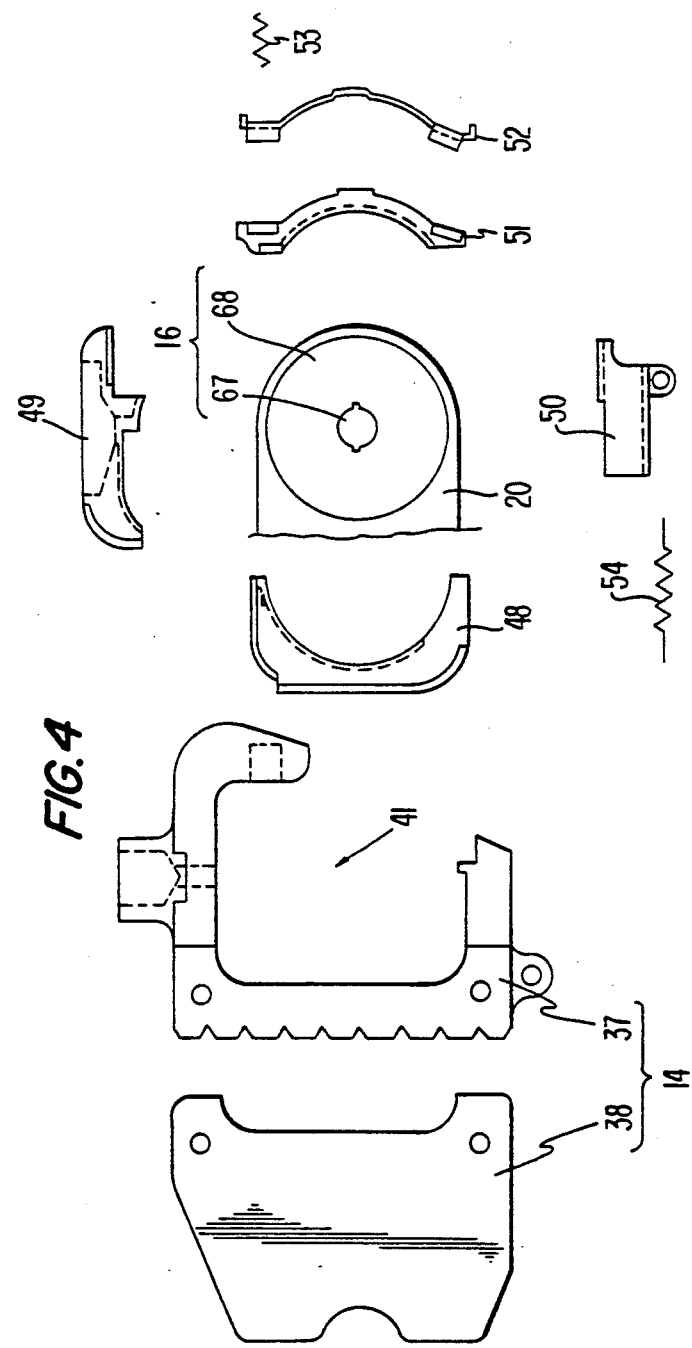

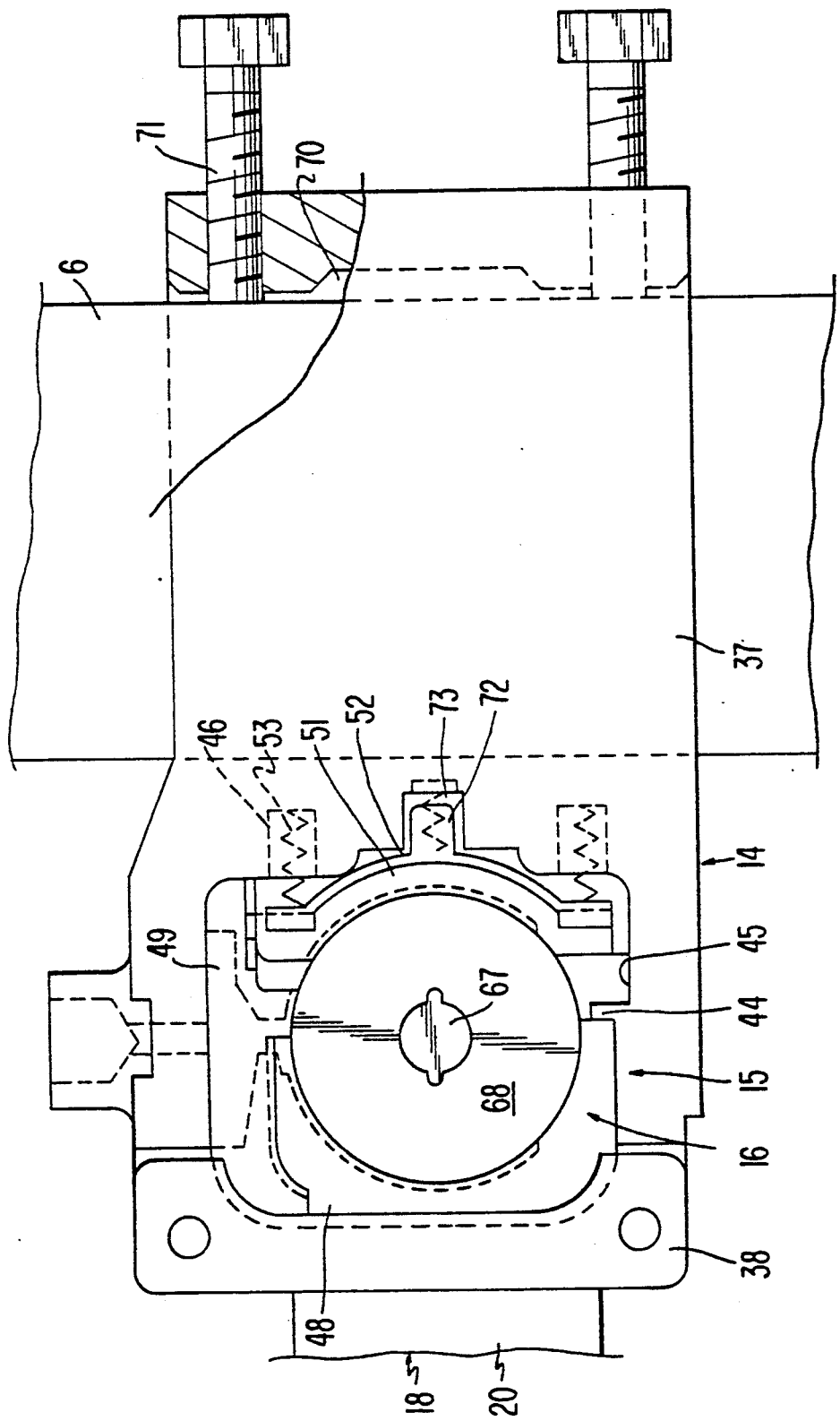

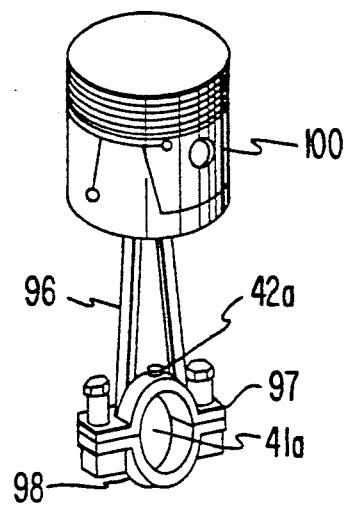
FIG. 25
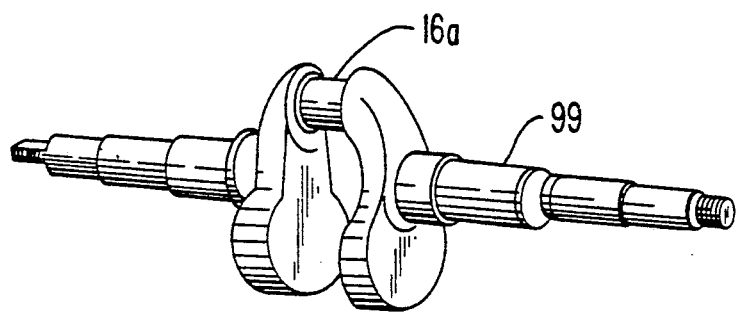
FIG. 26
FIG. 27
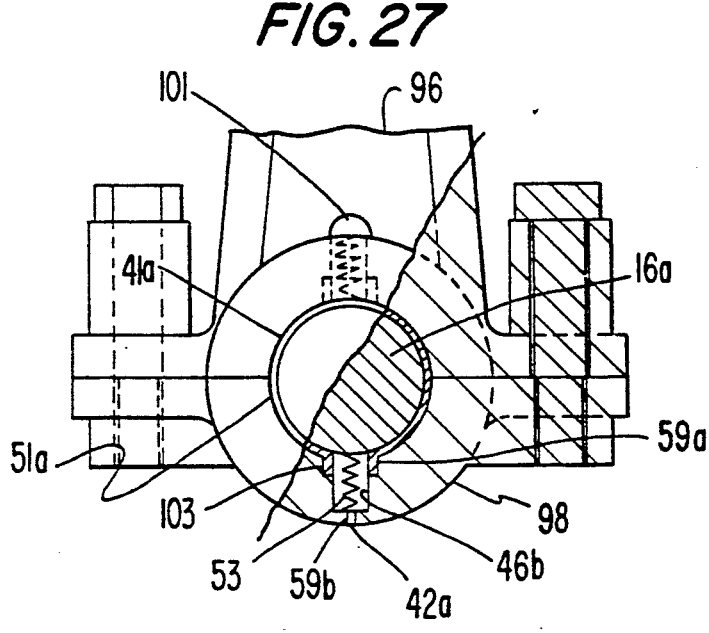
FIG. 28
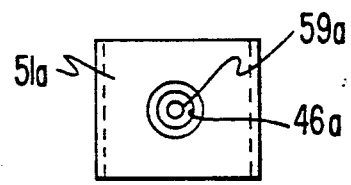
FIG. 29
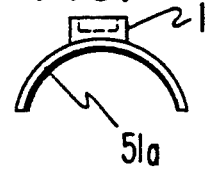

BACKLASH ABSORBING SYSTEM FOR BEARINGS

BACKGROUND OF THE INVENTION

1. Field of the Invention

The present invention relates to a backlash absorbing or preventing system for bearings which function to support shafts, stems, axles or any other similar machine elements arranged to be vertically or horizontally swung or rotated.

2. Description of the Prior Art

Shafting which has swinging or rotating motion is widely used in, for example, automobile engines, marine engines, wire connectors in weaving machines, and many other machine components. In general, such shafting is supported upon a bearing. As a result, the journal portion of the shafting and the internal mating portion of the bearing, or the internal circumferential surface of the bushing thereof are inevitably worn out owing to and during the swinging or rotating movement of the shafting, whereby the shafting is caused to undergo a backlash or lost motion within and relative to the bearing. In, for example, a negative type weaving machine such as illustrated in FIG. 1, which is a schematic elevational view of the overall arrangement thereof, a wire connector 8 is connected in one end thereof to connecting wires 7 which connect a shedding motion 5 and a harness frame 2 to each other, while on the other hand, the wire connector 8 is engaged with a shedding lever 6 of the shedding motion 5. In this case, the shedding motion is exemplified in the form of a cam machine. In order to allow the engagement of the wire connector 8 with the shedding lever, the wire connector is usually provided with a bracket which comprises a pair of spaced-apart side plates, and a lever engaging member is arranged between both side plates. With such an arrangement, the shedding lever of the shedding motion is inserted between the side plates of the wire connector, and is firmly mated with the lever engaging member. This engaging member comprises a bearing means, and the bearing means has a supporting shaft pivotably supported thereacross.

A long-term operation of the foregoing type weaving machine arranged as described in the foregoing subjects the outer circumferential surface of this supporting shaft and the inner peripheral surface of the bearing means to wear or abrasion therebetween, particularly in each connecting wire side portion. The reason why the supporting shaft and the bearing means are worn out or abraded, particularly in their portions adjacent to the connecting wires, is that external force acts concentrically upon such portions of the supporting shaft and the bearing means when the weaving machine is in operation.

If the outer circumferential surface of the supporting shaft and the inner circumferential surface of the bearing means are thus worn out or abraded, a backlash is introduced between the supporting shaft and the bearing means as described in the foregoing. In the foregoing type of weaving machine, such a backlash causes the supporting shaft to be reciprocatively moved horizontally or vertically in proportion to the backlash of the supporting shaft relative to and within the bearing means as a result of the swinging movement of the shedding lever, and an extreme vibration or shake occurs in the connecting wire joined to the wire connector in which the supporting shaft and the bearing means are provided. This causes the connecting wires to undergo great impact force and consequently to be slackened. If the slack of the connecting wires become greater with the operation of the weaving machine, the connecting wires are subjected to vibration and impact force, which are also proportionally still more increased. As a result, the connecting wires undergo rupture. This disadvantage is more conspicious in weaving machines of recent years which are operated at a far higher speed.

The weaving machine is also available as the positive type as well as the foregoing negative type. In a positive type weaving machine such as shown in FIG. 23, a pair of interlocking leverage means 93, 93 of an L-shaped configuration are connected to each other by using a horizontal linking rod 92, and are joined to the harness frame 2 through vertical linking rods 94, 94. The left-hand side one of both interlocking leverage means 93 is connected to the shedding motion 5 by means of an actuating linking rod 95 through the shedding lever (not shown).

The leverage means are arranged to pivot about supporting shafts 16. The supporting shafts are worn out or abraded as well as mating bearing means provided in the leverage means while the weaving machine including the leverage means is operated over a long period of time. A backlash is thus created between the supporting shaft and the bearing means also in the positive type weaving machine. This causes the shedding motion to fail to achieve a predetermined amount of warp shedding, and any resulting sheds in the warps are decreased in size. Also, the backlash between the supporting shaft and the bearing means introduces vibration and noises in the operation of the weaving machine.

The negative type and the positive type weaving machine are respectively subjected to a backlash between the shafting and the mating bearing means as described in the foregoing.

Such a backlash is not limited in the occurrence thereof to the weaving machines. For example, automobile engines and marine engines also undergo this kind of backlash.

As illustrated in FIG. 25, the automobile engines and the marine engines comprise a piston 100 and a connecting rod 96 in addition to a cylinder (not shown). The connecting rod 96 is provided with a big end portion 97 having a semi-circular configuration, and forms a bearing inserting aperture 41a with a bearing cap 98. In FIG. 26, a crankshaft 99 is shown which comprises a crankpin 16a, and this crankpin 16a is inserted through the bearing inserting aperture 41a. The bearing inserting aperture 41a is fitted with a bearing metal on the inner circumferential surface thereof. A backlash is created between the crankpin 16a and this bearing metal.

This backlash causes the automobile engines and the marine engines to undergo critical trouble in which the piston stroke is not accurately reflected in the rotation of the automobile wheel and the marine propeller. Also, the backlash between the crankpin and the bearing metal in the bearing inserting aperture of the connecting rod makes much more noise in the operation of the automobile and marine engines. Moreover, this backlash threatens damage of the crankpin.

As is apparent from the foregoing Description of some examples, the mechanical engagement of the shafting and the mating bearing means with each other is inevitably subjected to a backlash as a result of their wear or abrasion. However, in spite of this fact, the prior art has not made any system or provisions for absorbing or preventing a backlash in such a mechanical engagement. For this reason, some backlash absorbing useful system or means has been desired to be provided for bearings in many mechanical industries.

SUMMARY OF THE INVENTION

It is a primary object of the present invention to provide backlash absorbing or preventing system or means for bearings, in which the foregoing disadvantages and problems of the conventional bearing means which function to support the shafting thereon are overcome.

An object of the present invention is to provide a bearing system arranged to support a shaft or any other similar machine element rotatably thereacross and adapted to be unrotatably inserted in a bearing inserting aperture in a different machine element, comprising a fixed bushing, a movable bushing, and springs which allow the movable bushing to approach the fixed bushing. In this case, the fixed bushing is secured in the bearing inserting aperture such that it is located nearer than the shaft to the source of external force which acts upon the bearing system. Also, the movable bushing is disposed to hold the shaft with the aid of the fixed bushing, and the movability of this bushing is such as to be with respect to the fixed bushing.

The bearing inserting aperture may be provided with a pressure spring in the inner surface thereof such that the spring is located between this inner surface of the aperture and the movable bushing to force the movable bushing toward the fixed bushing.

Also, the bearing system may be formed with an engaging member which is engaged with one end portion of the movable bushing, and a tension spring is also arranged between this engaging member and an attaching member in which the bearing inserting aperture is formed, to thereby draw the movable bushing in the direction of the fixed bushing.

Alternatively, a plate spring of small thickness may be employed in the place of the pressure spring and the tension spring. In this case, the plate spring is located to surround the outer peripheral surfaces of the fixed and movable bushings.

Moreover, a lubricant supply bushing may be located between the fixed bushing and the movable bushing, and this lubricant supply bushing may be formed with a lubricant feeding hole which feeds a lubricant to the outer circumferential surface of the shaft. In connection with this, the attaching member in which the bearing inserting aperture is made is provided with a lubricant hole to supply a lubricant to the lubricant feeding hole of the lubricant supply bushing. Also, the fixed bushing and the movable bushing may be provided with a lubricant guiding groove along their inner peripheral surfaces to feed these peripheral surfaces with a lubricant supplied from the lubricant feeding hole of the lubricant supply bushing.

In one embodiment of the present invention, the fixed bushing is not used, and alternatively, two movable bushings are employed to hold the shaft therebetween, and two springs are applied to allow both movable bushings to approach each other.

In the preceding embodiment of the invention, a lubricant feeding bushing may be also provided between a pair of movable bushings, and as described in the foregoing embodiment in which the fixed bushing is used for one of both bushings which function to hold the shaft therebetween, this lubricant feeding bushing may be formed with a lubricant supplying hole which feeds a lubricant to the outer circumferential surface of the shaft. Also, as described in the foregoing, in order to supply a lubricant to the lubricant supplying hole of the lubricant supply bushing, a lubricant hole is made in the attaching member in which the bearing inserting aperture is made. The provision of a lubricant guiding groove on the inner peripheral surface of each movable bushing is similarly feasible as described in the foregoing.

In this case, the lubricant guiding groove may be ramified in the longitudinal middle thereof into two subgrooves.

In operation, if the inner circumferential surface of the bearing system provided by the present invention and the outer circumferential surface of the shaft rotatably supported thereacross are worn out or abraded, the backlash absorbing system according to the present invention allows the movable bushing or bushings to move positively in the direction of the shaft, thereby achieving the prevention of a backlash between the shaft and the bearing system.

BRIEF DESCRIPTION OF THE DRAWINGS

The present invention will be described with reference to the accompanying drawings, in which:

FIG. 1 is a schematic elevational view showing the overall arrangement of a negative type weaving machine provided with a wire connector which includes the bearing system according to a first preferred embodiment of the present invention;

FIG. 2 is a partially cross sectional side view of a principal portion of the weaving machine shown in FIG. 1;

FIG. 3 is a plan view of FIG. 2;

FIG. 4 is an exploded view of an attaching member and the bearing system formed therein according to the first preferred embodiment of the present invention;

FIG. 16 is a partially cross sectional side view of the bearing system according to a third preferred embodiment of the present invention;

FIG. 25 is a perspective view which explains the assembled state of a piston and a connecting rod of a general type automobile or marine engine;

FIG. 26 is a perspective view of a crankshaft comprising a crankpin which is to be attached to the connecting rod shown in FIG. 25;

FIG. 27 is a partially sectional elevational view of the big end portion of the connecting rod and a cap mated therewith, in which the bearing system according to an eighth preferred embodiment of the present invention is inserted through a bearing inserting aperture formed at the big end portion of the connecting rod by using the cap;

FIG. 28 is a plan view of a movable bushing provided with a lubricant feeding hole and a pressure spring hole; and FIG. 29 is a side view of the movable bushing as shown in FIG. 28.

DETAILED DESCRIPTION OF THE PREFERRED EMBODIMENTS

Figure 5:
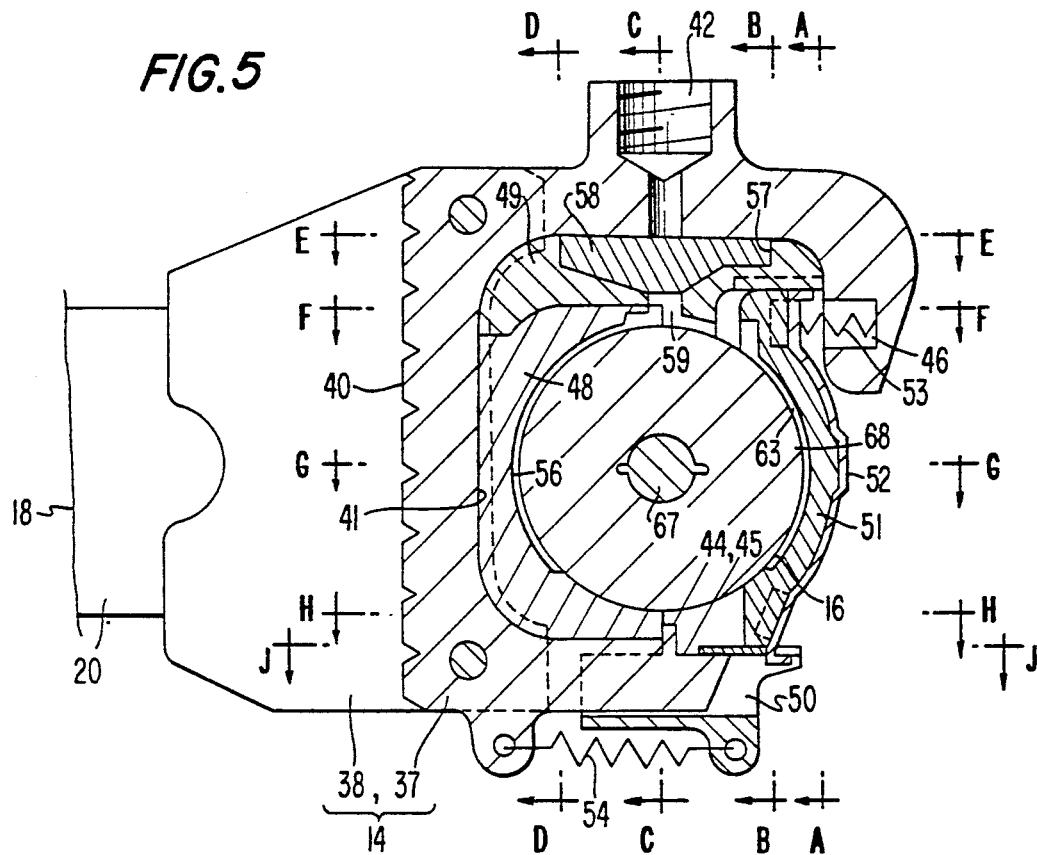
FIG. 5 is a cross sectional view of the bearing system according to the first preferred embodiment of the present invention.
Figure 6:
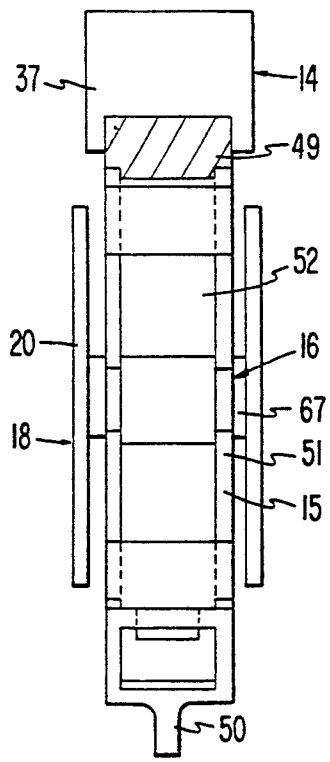
FIG. 6 is a cross sectional view taken along the line A—A of FIG. 5.

The first preferred embodiment of the bearing system according to the present invention will be described with reference to FIGS. 1 to 14.

FIG. 1 shows one harness frame 2 which is vertically movable with a frame 1 of a weaving machine. A plurality of such harness frames 2 extend horizontally within the frame 1 and each harness frame 2 is provided with a large number of heddles 3 which are vertically aligned with each other. Each heddle 3 is provided with a warp passing eye or male 4 located centrally therein.

A shedding motion 5 for the weaving machine is a cam machine in this embodiment of the invention, and this cam machine is located in a lower outside portion of the machine frame 1 of the weaving machine. Extending from the shedding motion are a great number of shedding cam levers 6 in parallel and in proximity which pivot about a horizontal axis extending into the plane of FIG. 1. Each shedding cam lever 6 is connected with the right-hand side and the left-hand side lower edge portion of the harness frame 1 through connecting wires 7 and a wire connector 8. Located on the left-hand side and the right-hand side upper portion of the harness frame are a pair of pulling means 9 which draw the harness frame 2 upwardly by means of connecting wires 10. Pulleys 11 are supported for rotation on the upper and the lower portion of the machine frame 1 to guide the upper connecting wires 10 and the lower connecting wires 7.

As shown in FIGS. 2 and 4, the wire connector 8 comprises a bracket 13, an attaching member 14, a bearing system 15, and a supporting shaft 16.

The bracket 13 is preferably made of sheet metal and comprises a pair of spaced-apart side plates 18. The side plates 18 are connected to the connecting wire at their one ends, and both side plates 18 have an attaching member 14 pivotally held therebetween at their opposite free end by using a supporting shaft 16 which rests upon a bearing system 15.

The attaching member 14 is engaged with the shedding cam lever 6 of the shedding motion 5, and comprises a body member 37 and a pair of side plates 38 which extend from the left-hand end portion of the body member 37 in the direction of the bracket end at which the connecting wires 7 are connected to the bracket.

The left-hand end surface of the body member 37 is formed with an engaging surface 40 which is detachably engaged with a serrated mating surface 39 of the shedding cam lever 6 such that the shedding cam lever can be vertically adjusted in the engaging position thereof with the serated mating surface 39, thereby allowing the harness frame to adjust the warp shedding size thereof. The body member 37 is hollow in the inside thereof to form a bearing inserting aperture 41 therein which is opened on the left-hand side end portion thereof. This aperture 41 comprises a top wall portion, a bottom portion, a side wall portion which connects the left-hand side end portions of the top wall portion and the bottom portion with each other, and a drooping portion which extends downwardly from the right-hand side end portion of the top wall portion.

The top wall portion of the body member 37 is provided with a lubricant hole 42 in the longitudinally central portion thereof, and this lubricant hole has a lubricant feeding pipe 43 detachably screwed thereto as shown in FIG. 2. The bottom wall portion of the body member 37 is formed with an upwardly projecting portion 44 and a recessed portion 45 in the end portion thereof. The drooping portion of the body member 37 has a spring insertion groove 46 extending from the inner peripheral surface thereof toward the outer peripheral surface thereof.

The body member 37 is recessed from the outer surfaces thereof in the side portion thereof in which the side plates 38 are attached thereto, whereby the outer surfaces of the side plates 38 become flush with those of the body member 37 when the side plates 38 are attached to the outer surfaces of the body member 37.

The bearing system 15 is detachably inserted in the bearing attaching aperture 41 of the attaching member 14, and comprises a fixed bushing 48, a lubricant supply bushing 49, an engaging member 50, a movable bushing 51, a slider means 52, a pressure spring 53, and a tension spring 54. The slider means 52, the pressure spring 53, and the tension spring 54 are all made of metal, the other members of Nylon.

The fixed bushing 48 is secured within the bearing inserting aperture 41. This fixed bushing 48 is brought in contact with the inner peripheral surface of the bearing inserting aperture 41 around the lower portion of the side wall portion of the body member 37 and in the left-hand side portion of the bottom wall portion of the body member 37. The fixed bushing 48 is also brought in abutment with the projecting portion 44, to thereby prevent movement of the fixed bushing 48 toward the right-hand side. The fixed bushing 48 is formed with a lubricant guiding groove 56 along the inner peripheral surface thereof except for the lower portion thereof.

The lubricant supply bushing 49 is brought in contact with each inner peripheral surface of the top wall portion, the upper portion of the side wall portion, and the upper portion of the drooping portion in the body member 37, while at the same time, this lubricant supply bushing is also brought in abutment with the upper surface of the fixed bushing 48. The fixed bushing 48 and the lubricant supply bushing 49 are arranged to lock within the bearing system 15 by using the side plates 38 of the attaching member 14 so that these bushings are prevented from detachment from the inside of the bearing system.

The fixed bushing 48 and the lubricant supply bushing 49 are respectively recessed from their outer surfaces in their side portions which have the side plates 38 brought into contact with them, whereby the outer surfaces of the side plates 38 become flush with those of the fixed bushing 48 and the lubricant supply bushing 49 when the side plates 38 are attached to the outer surfaces of the fixed bushing 48 and the lubricant supply bushing 49.

Figure 7:
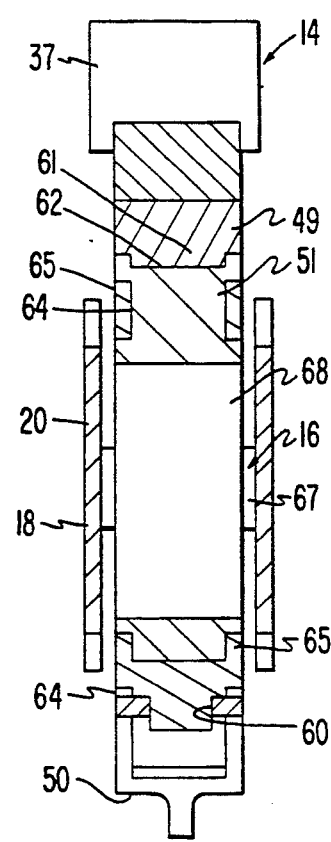
FIG. 7 is a cross sectional view taken along the line B—B of FIG. 5.
Figure 8:
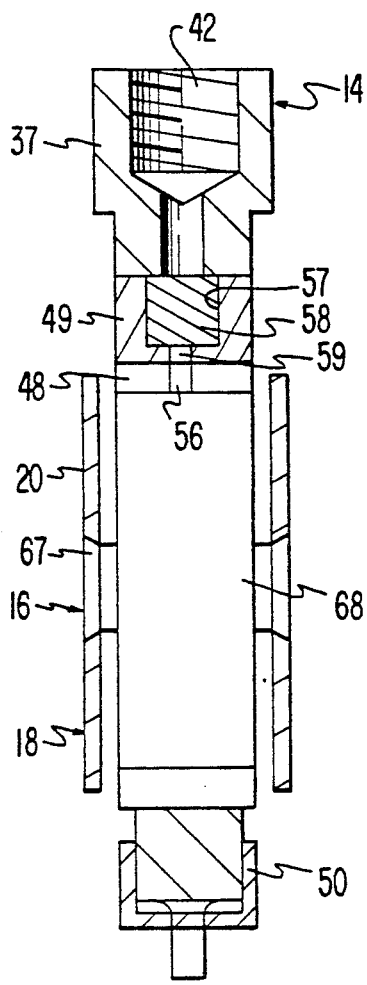
FIG. 8 is a cross sectional view taken along the line C—C of FIG. 5.
Figure 9:
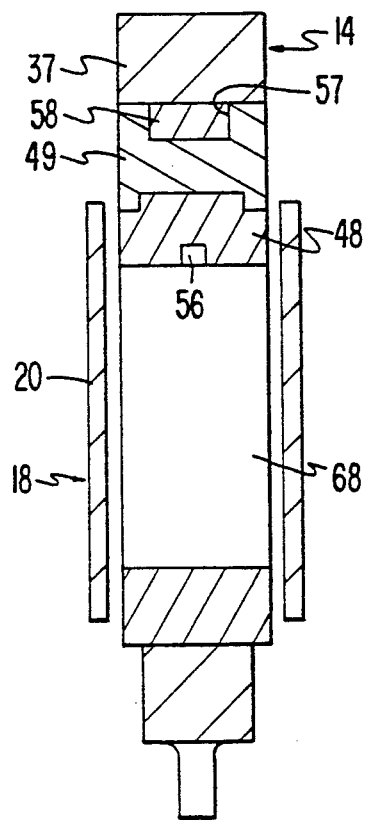
FIG. 9 is a cross sectional view taken along the line D—D of FIG. 5.
Figure 10:
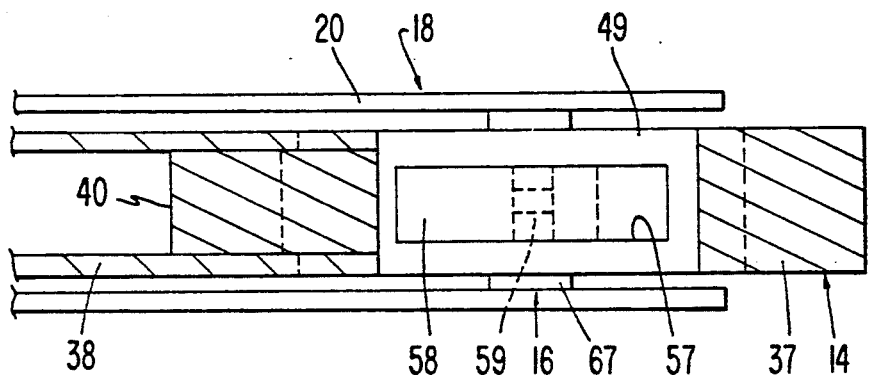
FIG. 10 is a cross sectional view taken along the line E—E of FIG. 5.
Figure 11:
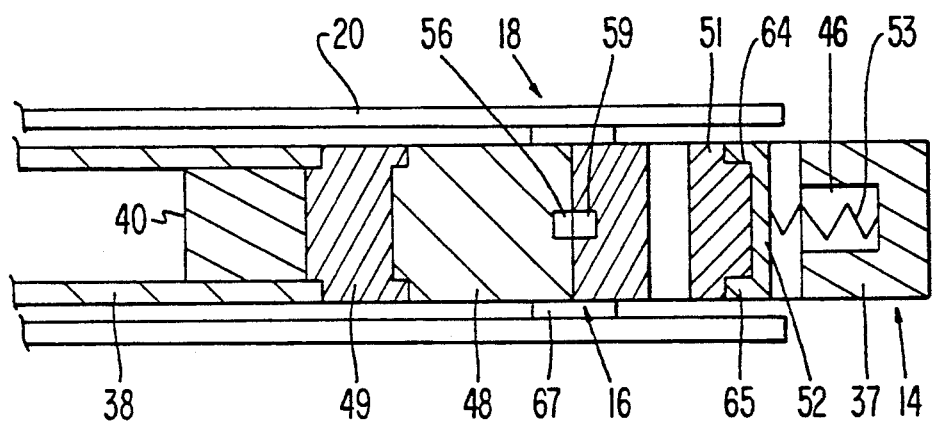
FIG. 11 is a cross sectional view taken along the line F—F of FIG. 5.
Figure 12:
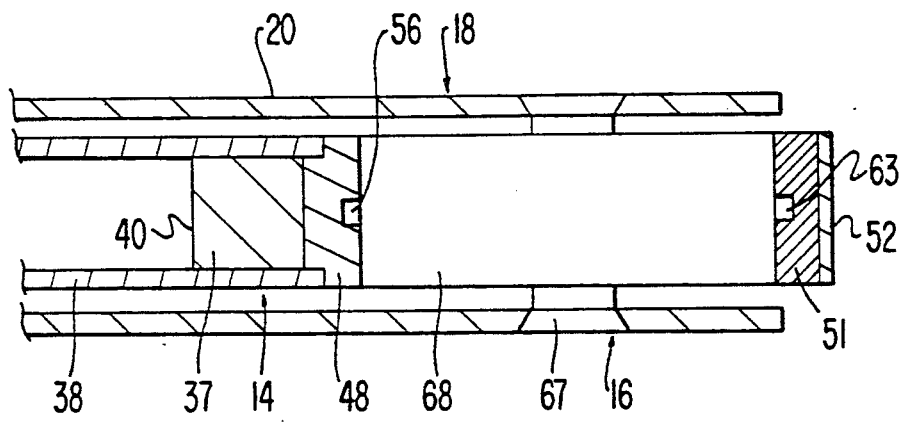
FIG. 12 is a cross sectional view taken along the line G—G of FIG. 5.
Figure 13:
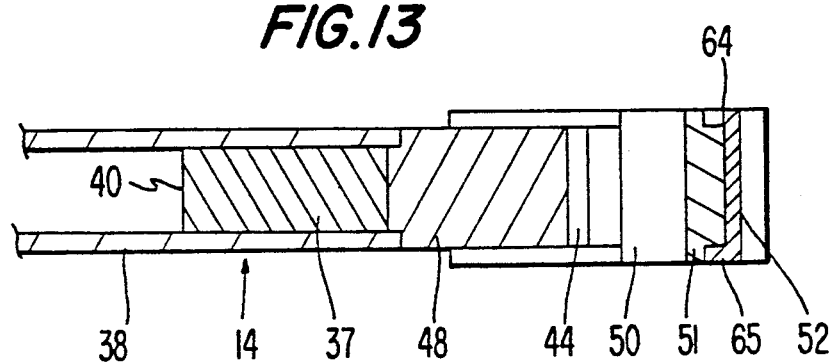
FIG. 13 is a cross sectional view taken along the line H—H of FIG. 5.
Figure 14:
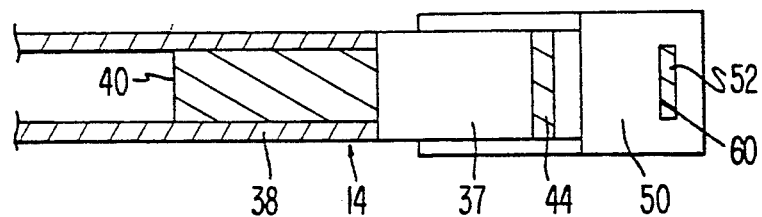
FIG. 14 is a cross sectional view taken along the line J—J of FIG. 5.

The lubricant supply bushing 49 is engaged in the left-hand side lower surface thereof with the upper surface of the fixed bushing 48 to prevent any transversal movement of both bushings 48 and 49 relative to each other. Also, the lubricant supply bushing 49 is formed with a downwardly projecting portion 61, as shown in FIG. 7, and this projecting portion 61 is mated with a recessed portion of the movable bushing 51.

Moreover, the lubricant supply bushing 49 is provided with a lubricant reserving groove 57 of elongated rectangular shape which is communicatively connected to the lubricant hole 42 of the body member 37. This lubricant reserving groove 57 has a lubricant retaining member 58 held therein to keep the lubricant retaining member infiltrated with a lubricant. A sponge, cotton or any other similar material is used for the lubricant retaining member 58.

The lubricant reserving groove 57 is formed with a downwardly extending lubricant feeding hole 59 through the bottom portion thereof. This lubricant feeding hole 59 is communicatively connected in the lower portion thereof to a lubricant guiding groove 56 extending along the inner peripheral surface of the fixed bushing, while at the same time, the lower portion of the lubricant feeding hole 59 is opened in the right-hand side thereof.

The engaging member 50 is formed in a configuration of a square pillar, and is substantially free from the upper wall portion thereof except for the right-hand side end portion thereof, and is inserted in the bottom wall portion of the body member 37 such that the engaging member so can be horizontally moved. The right-hand side upper wall end portion of the engaging member 50 is engaged with the recessed portion 45 of the bottom wall portion of the body member 37. An upper wall portion of small width which is formed at the right-hand side end portion of the engaging member 50 and the upwardly projecting portion 44 in the bottom wall portion of the body member 37 forms a horizontal spacing cojointly therebetween. Also, the engaging member 50 is formed with an engaging groove 60 in the upper wall portion of small width.

The movable bushing 51 is opposed to the fixed bushing 48 such that the movable bushing is allowed to freely advance or retreat, and cooperates with the fixed bushing 48 and the lubricant supply bushing 49 to hold the supporting shaft 16 rotatably. The upper end portion of the movable bushing 51 and the lower end portion of the lubricant supply bushing form a horizontal spacing therebetween, and the upper end portion of the movable bushing 51 is formed with an engaging recessed portion 62 which is meshed with the downwardly projecting portion 61 of the lubricant supply bushing 49 such that the engaging recessed portion 62 can be horizontally moved. Also, the lower end surface of the movable bushing is brought in contact with the upper surface of the engaging member 50 such that the lower end surface can be horizontally slid. The inner peripheral surface of the movable bushing is formed with a lubricant guiding groove 63 substantially over the entirety thereof. This lubricant guiding groove is fed with a lubricant from the lubricant feeding hole 59 which extends from the bottom of the lubricant supply bushing 49. The movable bushing 51 is provided with a recessed portion 64 on each side of the right-hand side end portions of the upper and the lower end portions thereof.

The slider means 52 is brought in contact with the outer peripheral surface of the movable bushing 51. The upper end portion of the slider means 52 is brought in slidable abutment with the downwardly projecting portion 61 of the lubricant supply bushing 49, while at the same time, the slider means is detachably engaged by a lower end portion thereof with an L-shaped configuration with the engaging groove 60 of the engaging member 50. Also, the upper and the lower end portion of the slider means 52 are respectively formed with a pair of engaging pieces 65 on the respective both sides. These engaging pieces 65 are disengageably meshed with the insides of the recessed portions 64.

The pressure spring 53 is inserted between the bottom surface of the spring inserting groove 46 and the upper portion of the slider means 52, and forces the slider means 52 and the movable bushing 51 in the direction of the fixed bushing 48.

The tension spring 54 is inserted between the bottom wall portion of the body member 37 and the engaging member 50, to thereby draw the slider means 52 and the movable bushing 51 towards the fixed bushing 48.

The supporting shaft 16 is pivotally held by means of the bearing system 15, and comprises an inner metal shaft element 67 and an outer shaft element 68. The inner metal shaft element is expanded or peened over at both end portions thereof to fix it to both side plates 18 of the bracket 13 and the outer shaft element 68. The inner metal shaft element 67 is engaged, in the outer circumferential surface thereof, with the side plates 18 and the inner circumferential surface of the outer shaft element 68, such that the inner metal shaft element 67 and the outer shaft element are prevented from rotating relative to each other to obviate any wear or abrasion of these shafts elements 67 and 68. The outer shaft element 68 is made of metal or from ceramics.

In operation, according to the foregoing preferred embodiment of the present invention, each harness frame 2 is drawn upwardly by means of the pulling means 9, and if any desired one of the shedding cam levers 6 in the shedding motion 5 is swung counterclockwise, the harness frame 2 corresponding to the swung cam lever 6 is drawn downwardly, and as a result, warps passing through the males of the heddles in this harness frame 2 are accordingly pulled downwardly, whereby warps thus pulled downwardly form sheds with respect to other warps, and a weft is cast through the sheds thus formed.

A lubricant fed into the lubricant reserving groove 57 of the lubricant supply bushing 49 in the bearing system from the lubricant feeding pipe 43 through the lubricant hole 42 of the body member 37 reaches the outer circumferential surface of the outer shaft element 68 of the supporting shaft 16, and moreover, this lubricant is downwardly guided from the outer circumferential surface of the outer shaft element 68 to both of the outer circumferential surface of the outer shaft element 68 of the supporting shaft 16 and the inner circumferential surface of the bearing system 15 through the lubricant guiding grooves 56 and 63, to thereby achieve the circumferential satisfactory lubrication of the outer shaft element 68 and the bearing system 15.

Also, since the lubricant reserving groove 57 of the lubricant supply bushing 49 is provided with the lubricant retaining member 58 therein which is kept infiltrated with a lubricant, the lubricant reserving groove 57 is capable of reserving a lubricant constantly therein over a long period of time. This allows the long-term satisfactory lubrication of the outer circumferential surface of the outer shaft element 68 of the supporting shaft 16 and the inner circumferential surface of the bearing system 15, and ensures the smooth rotating operation of the supporting shaft 16 relative to the inner circumferential surface of the bearing system 15 even if the swinging movement of the shedding cam lever 6 turns the attaching member 14 as a whole.

However, even if the the outer circumferential surface of the outer shaft element 68 of the supporting shaft 16 and the inner circumferential surface of the bearing system 15 are lubricated as described in the foregoing, the outer shaft element 68 of the supporting shaft 16 and the bearing system 15 are inevitably worn out or abraded as a result of long-term operation of the weaving machine. In the operation of the weaving machine, the shedding cam lever 6 of the shedding motion 5 draws the connecting wires 7 against the drawing operation of the pulling means 9. Consequently, the outer circumferential surface of the outer shaft element 68 and the outer peripheral surface of the fixed bushing 48 are subjected to great external force particularly in their connecting wires 7 side portions, namely, their left-hand side portions. This causes both surfaces to be still more worn out or abraded.

At this particular time, according to the wear amounts of the outer shaft element 68 and the fixed bushing 48, the pressure spring 53 forces the movable bushing 51 through the slider means 52 in the direction of the fixed bushing 48, while at the same time, the tension spring 54 pulls the engaging member 50 directly, and the engaging member 50 is drawn to the left together with the movable bushing.

As is apparent from this operation of the bearing system according to the first preferred embodiment of the invention, the outer shaft element 68 of the supporting shaft 16 and the bearing system 15 creates no backlash therebetween. Therefore, the bearing system according to the first preferred embodiment of the invention does not raise any problem in which the backlash between the supporting shaft 16 and the bearing system 15 would cause the supporting shaft 16 to undergo reciprocating movement within the bearing system 15 in proportion to the backlash and the connecting wires 7 would be subjected to a positional fluctuation or any other abnormal or extreme vibration and therefore great impact force, whereby the connecting wires 7 would be elongated, and finally, the connecting wires would be ruptured.

Also, the bearing system according to this first preferred embodiment of the invention is arranged to receive external force thereupon by using the fixed bushing 48 rather than the supporting shaft 16. The fixed bushing 48 is greater in the area in which the fixed bushing is secured than the supporting shaft 16, and naturally, the fixed bushing 48 is more bearable against any external force than the supporting shaft 16, while on the other hand, the supporting shaft 16 is securely held.

Figure 15:
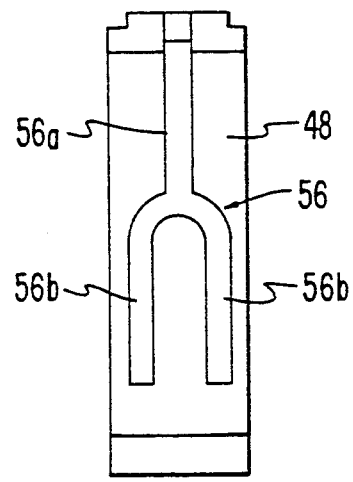
FIG. 15 is a side view of a fixed bushing which shows a second preferred embodiment of the present invention.

FIG. 15 shows a second preferred embodiment of the present invention. In FIG. 15, the lubricant guiding groove 56 of the fixed bushing 48 is ramified in the longitudinally middle thereof. As a result, the lubricant guiding groove 56 comprises a central groove 56a which is located in the upper and transversally central portion of the fixed bushing, and a pair of side grooves 56b which are positioned in both lower and horizontally end portions of the fixed bushing.

Such an arrangement of the lubricating groove on the inner peripheral surface of the fixed bushing allows the middle groove 56a and the side grooves 56b to be transversely spaced therebetween, thereby achieving an axially wider range of lubrication to both the outer circumferential surface of the outer shaft element 68 of the supporting shaft 16 and the inner circumferential surface of the bearing system 15 than in the foregoing first preferred embodiment of the invention.

The foregoing ramification of the lubricating guiding groove may be applied to the lubricating guiding groove 63 on the inner peripheral surface of the movable bushing 51 described and shown in the foregoing first preferred embodiment of the invention, and the lubricating guiding grooves 56 and 63 on the inner peripheral surfaces of the fixed bushing and the movable bushing which will now be described in the other preferred embodiments of the invention.

Figure 18:
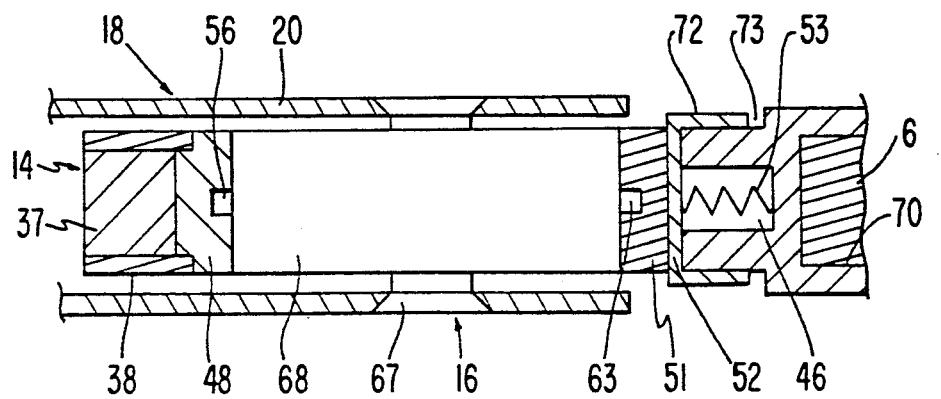
FIG. 18 is a cross sectional view taken along the line K—K of FIG. 17.
Figure 17:
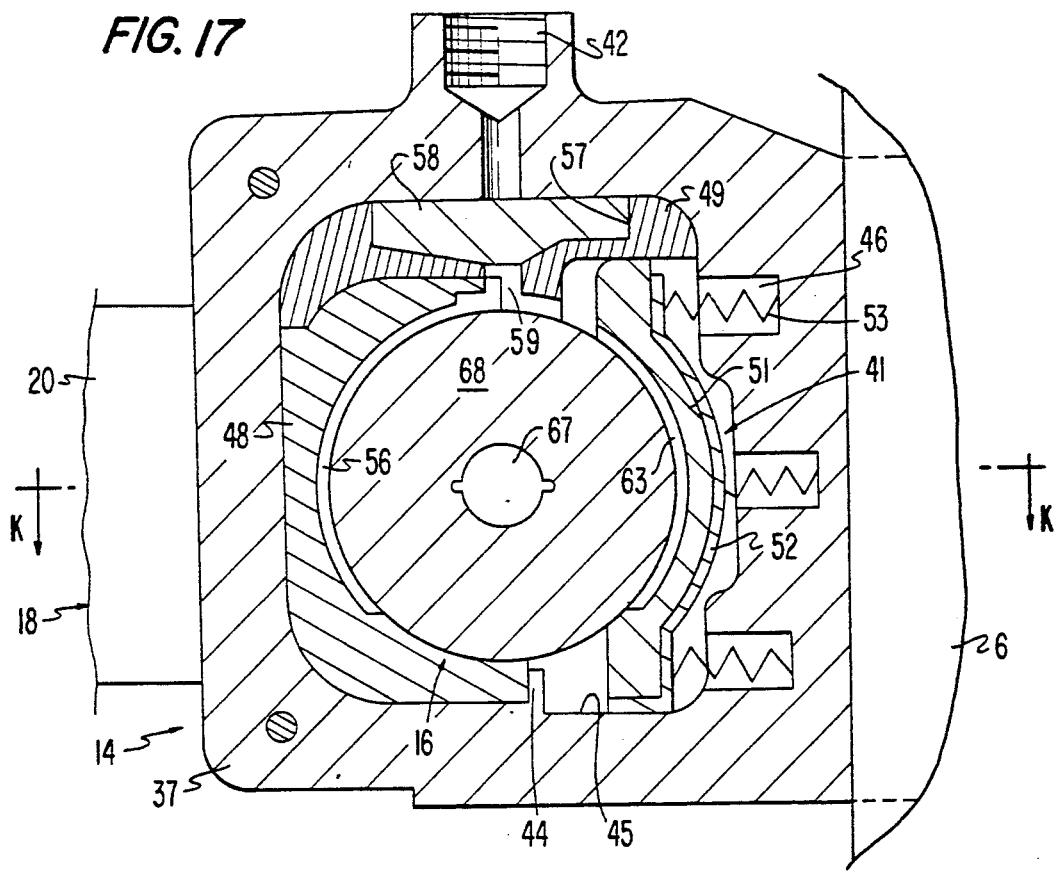
FIG. 17 is a longitudinal sectional view of the bearing system of FIG. 16.

FIGS. 16 to 18 show a third preferred embodiment of the present invention. In this embodiment of the invention, the attaching member 14 is formed in an elongated rectangular configuration. This attaching member 14 is formed with the bearing inserting aperture 41 of substantially square shape in the left-hand side portion thereof, and an inserting hole 70 for the shedding cam lever 6 in the right-hand side portion thereof. With such an arrangement, the shedding cam lever 6 is detachably fixed by means of bolts 71.

The bearing system 15 is not provided with the engaging member 50. The slider means 52 is formed with a pair of holding members 72 in the middle thereof so that these holding members 72 hold the attaching member 14 therebetween. The attaching member 14 is correspondingly provided with a recessed portion 73 in which the attaching member 14 is held between the holding members 72. Also, the lower end portion of the slider means 52 is brought in contact with the inner bottom surface of the bearing inserting aperture 41.

The bearing inserting aperture 41 is provided with three spring inserting holes 46 vertically spaced and in parallel in the right-hand side inner surface thereof. The pressure springs 53 are disposed between the inner bottom surfaces of the spring inserting holes 46 and the vertically upper, the vertically middle and the vertically lower end portions of the slider means 52 to force the movable bushing through the slider means 52 in the direction of the fixed bushing 48.

Figure 19:
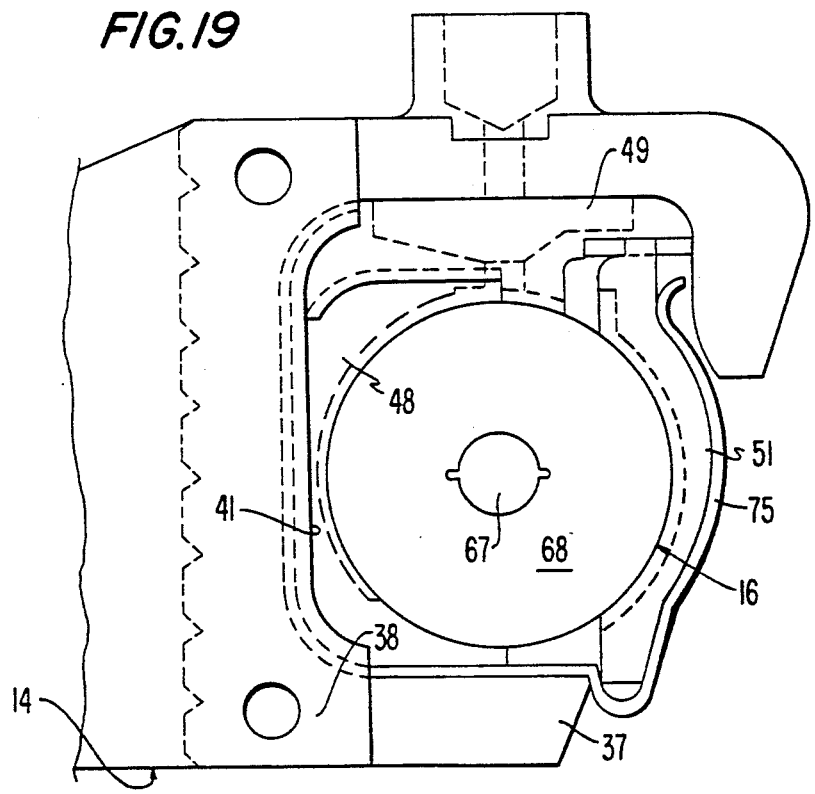
FIG. 19 is a side view of the bearing system according to a fourth preferred embodiment of the present invention.

FIG. 19 shows a fourth preferred embodiment of the present invention. The bottom wall portion of the attaching member 14 is not formed with the projecting portion and the recessed portion which are indicated at 44 and 45 in the first preferred embodiment of the invention. The bearing system 15 is not provided with the engaging member and the slider means which are respectively indicated at 50 and 52 in the first preferred embodiment of the invention. A plate spring 75 of small thickness is used in the place of the pressure spring and the tension spring which are both employed in the first preferred embodiment of the invention. This plate spring 75 is mounted along the outer peripheral surfaces of the lubricant supply bushing 49 and the fixed bushing 48, the inner bottom surface of the bearing inserting aperture, and the outer peripheral surfaces of the movable bushing 51 to force the moveable bushing 51 towards the fixed bushing 48.

Figure 20:
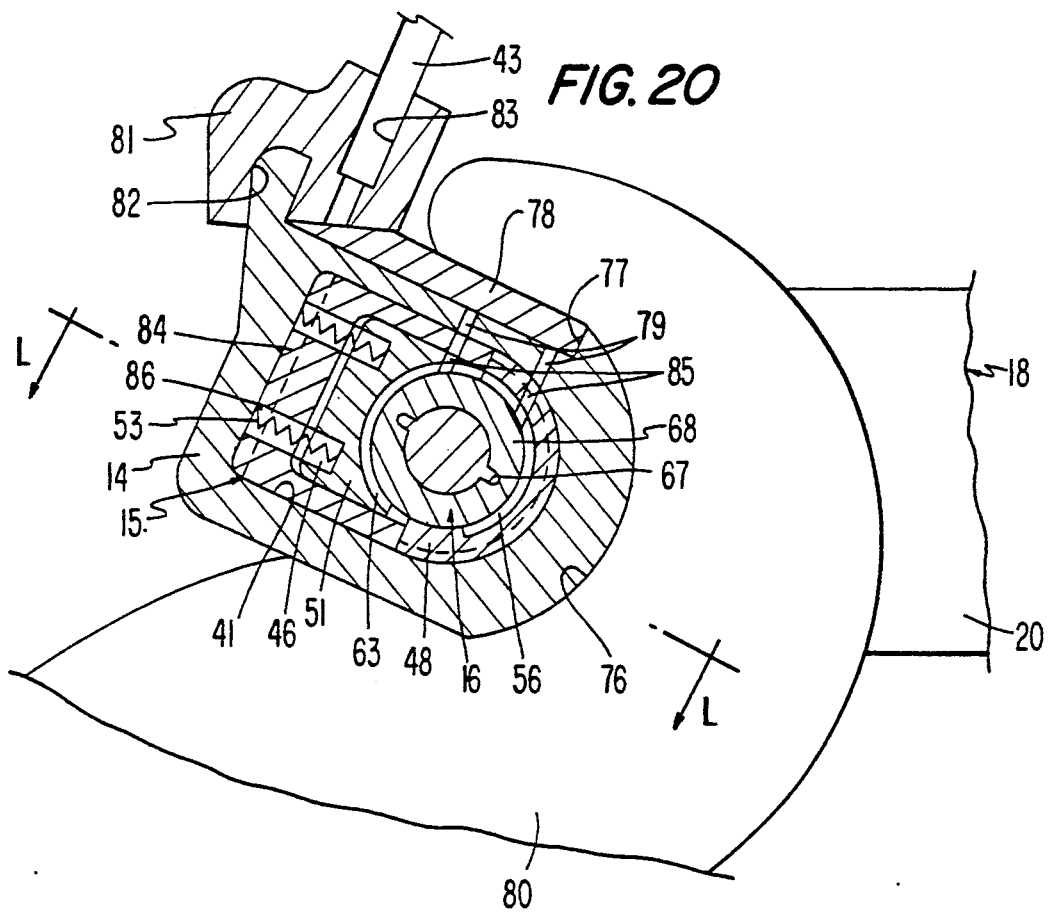
FIG. 20 is a longitudinal sectional view of the bearing system according to a fifth preferred embodiment of the present invention.
Figure 21:
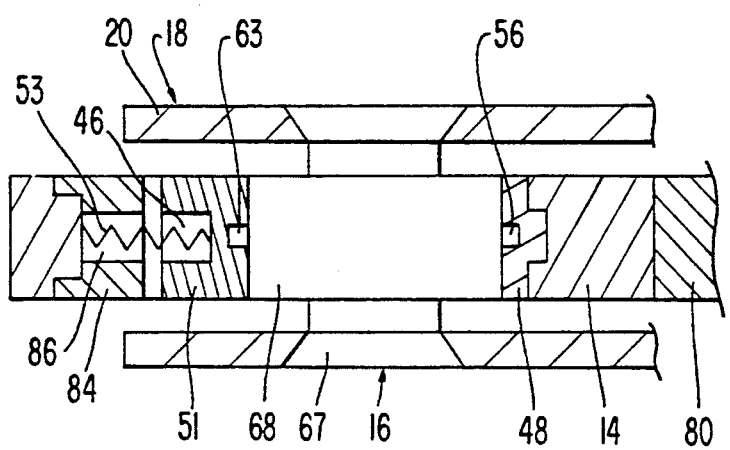
FIG. 21 is cross sectional view taken along the line L—L of FIG. 20.

FIGS. 20 and 21 show a fifth preferred embodiment of the present invention. The attaching member 14 is detachably engaged with an engaging recessed portion 76 of a shedding lever 80 of the shedding motion 5 which is a Dobby machine in this fifth preferred embodiment of the invention. The attaching member 14 is arranged to be hollow in the inside thereof to form the bearing inserting aperture 41 in this inside. Also, the attaching member is formed with a lubricant reserving groove 77 of elongated rectangular shape in the upper surface thereof. This groove 77 has a lubricant retaining member 78 included therein to reserve a lubricant therein. The lubricant reserving groove 77 is also provided with lubricant feeding passages 79 on the underside of an end portion thereof, which extends to the inside of the bearing inserting aperture 41.

A cap member 81 which is made from Nylon or any other similar elastic or elastomeric material is formed with an engaging recessed portion 82 in the lower portion thereof. This engaging recessed portion 82 is downwardly opened. The top portion of the left-hand end portion of the attaching member 14 is detachably meshed with this engaging recessed portion 82 by using the resilient deformation of the attaching member 81.

Moreover, the underside of the right-hand side lower portion of the cap member 81 gradually becomes more spaced apart, in the right-hand side direction thereof, from the bottom surface of the lubricant reserving groove 77, and is substantially horizontal, to thereby force the end portion of the lubricant retaining member 78 downwardly.

The right-hand side portion of the cap member 81 is formed with a through-hole 83 from the upper end surface thereof to the lower end surface thereof, and this through-hole 43 has a lubricant feeding pipe 43 detachably forced therein.

The bearing system 15 comprises the fixed bushing 48 formed in an arc configuration and fitted in the bearing inserting aperture 41, and a guide member 84 formed in a gate configuration, inserted in the bearing inserting aperture 41, and brought in contact with both end portions of the fixed bushing 48. Moreover, the bearing system also comprises the movable bushing 51 movably located inside the guide member 84, and the pressure springs 53.

The fixed bushing 48 is engaged in the outer peripheral surface thereof with the inner peripheral surface of the bearing inserting aperture 41 to prevent any transversal movement of the fixed bushing 48 in the right-hand side direction.

Also, the fixed bushing 48 is provided with a connecting groove 85 which joins the lubricant feeding passage 79 in the attaching member 14 to the lubricant guiding groove 56 formed between the outer circumferential surface of the supporting shaft 16 and the inner peripheral surface of the fixed bushing 48. The guide member 84 is engaged in the left-hand side end surface thereof with the inner peripheral surface of the bearing inserting aperture 41 to prevent any transversal movement of the guide member 84 in the left-hand side direction. Also, the guide member 84 is provided with a pair of through-holes 86 thereacross, while at the same time, the movable bushing 51 is formed with a pair of spring inserting grooves 46 which correspond in their positions to the through-holes 86, to thereby allow the pressure springs 53 to be inserted between the inside bottom surfaces of the spring inserting grooves 46 and the corresponding inner peripheral surface portions of the bearing inserting aperture 41 so that the movable bushing 51 is pressed in the direction of the fixed bushing.

Figure 22:
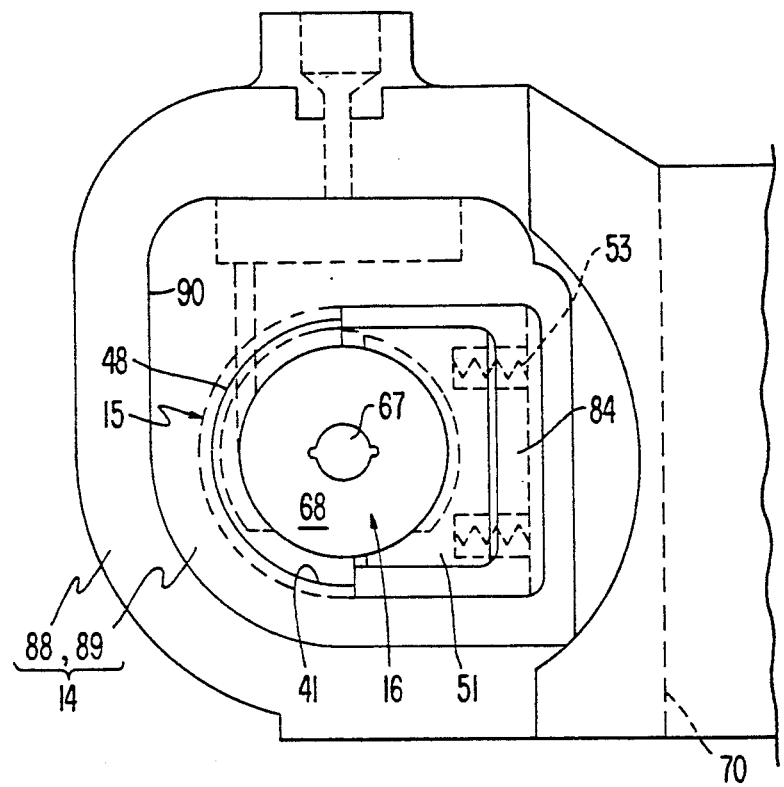
FIG. 22 is a side view of the bearing system according to a sixth preferred embodiment of the present invention.

In FIG. 22, which shows a sixth preferred embodiment of the present invention, the attaching member 14 comprises two kinds of members substantially as described and shown for the attaching member in the first preferred embodiment of the invention. One member is a bracket 88, and the other member is a body member 89.

The bracket 88 is formed with a fitting aperture of substantially square shape for the body member in the left-hand side portion, and this fitting aperture 90 has the body member 89 detachably inserted therein.

The body member 89 is hollow in the inside portion thereof to allow this inside portion to serve as the bearing inserting aperture 41 as described and shown in the first preferred embodiment of the invention. The bearing system 15 of substantially the same construction as that in the fifth preferred embodiment of the invention is detachably fitted in the bearing inserting aperture 41. The body member 89 is formed with the lubricant reserving groove 77 which is communicatively connected to the lubricant hole 42 of the bracket 88, and the lubricant, reserving groove 77 is communicatively connected to the connecting groove 85 of the bearing system 15 through the lubricant feeding passage 79.

Figure 23:
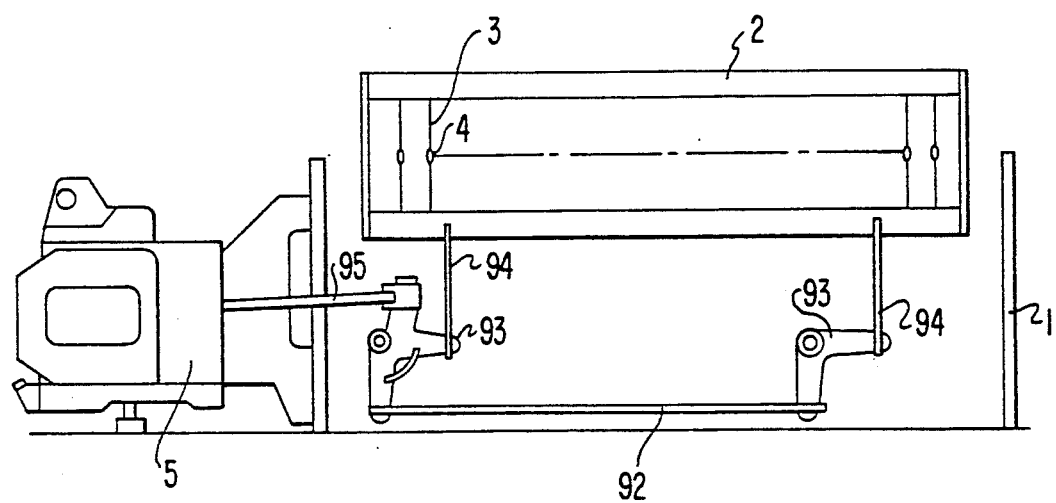
FIG. 23 is a schematic elevational view showing the overall arrangement of a positive type weaving machine in which leverage means incorporate the bearing systems according to a seventh preferred embodiment of the present invention.
Figure 24:
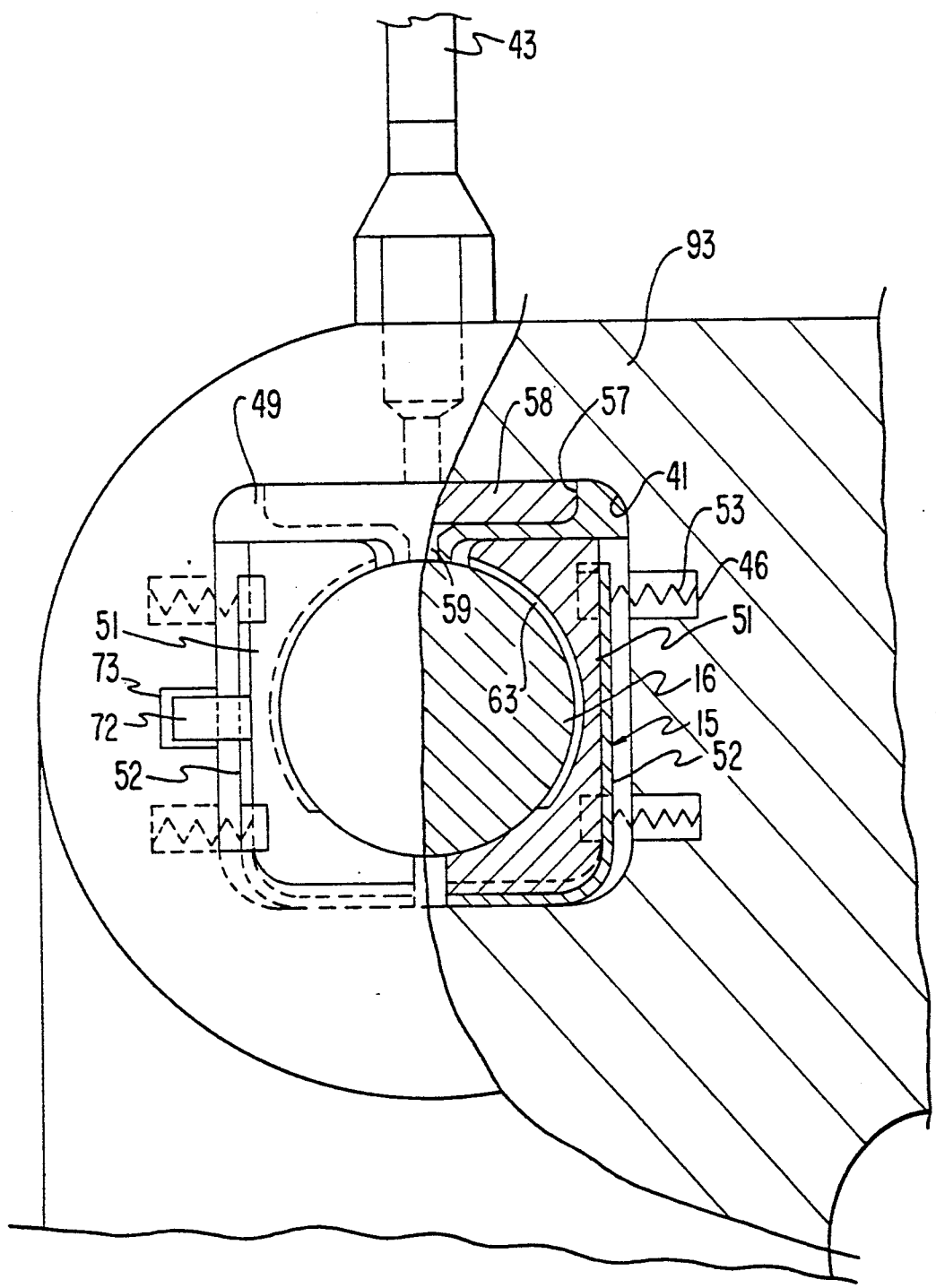
FIG. 24 is a partially sectional side view of the bearing system according to the seventh preferred embodiment of the present invention.

FIGS. 23 and 24 show a seventh preferred embodiment of the present invention. A weaving machine as illustrated in FIG. 23 is of the positive type. As already described in the foregoing, this positive type weaving machine comprises under the harness frame 2 the pair of left-hand side and right-hand side interlocking leverage means 93, 93 of an L-shaped configuration which are pivotally supported by means of the supporting shafts 16. The horizontal linking rod 92 connects both leverage means 93, 93 to each other, and achieves the interlocking operation of the leverage means 93, 93 relative to each other. Each leverage means 93 is connected to the harness frame 2 by using each vertical linking rod 94, while at the same time, the left-hand side leverage means 93 is joined to the shedding lever (not shown) of the shedding motion 5 through the actuating linking rod 95.

Each leverage means 93 is formed with the bearing inserting aperture 41 of substantially square shape in the portion thereof in which the supporting shaft 16 is mounted thereon. This bearing inserting aperture 41 is fitted with the bearing system 15 therein, and this bearing system 15 comprises the lubricant supply bushing 49, a pair of left-hand side and right-hand side movable bushings 51, a pair of left-hand side and right-hand side slider means 52 of an L-shaped configuration which are respectively brought in contact with the outer peripheral side surface and the bottom surface of each movable bushing 51, and the pressure springs 53.

The slider means 52 is formed with a pair of holding members 72 in the middle thereof so that these holding members 72 hold the attaching member 14 therebetween as described and shown in the third preferred embodiment of the the present invention.

The bearing system according to the present invention can be also applied to automobile engines and the marine engines, as best understood from FIG. 27. FIG. 28 shows along with FIGS. 25 to 27 and 29 an eighth preferred embodiment of the present invention wherein the bearing system according to the present invention is applied to bearing metal which is attached along the inner circumferential surface of a bearing inserting aperture 41a formed by means of a big end portion of connecting rod 96 and the bearing cap 98 to receive a crankpin 16a of a crankshaft 99. The movable bushings 51a are provided with projecting portions 102 on a big end side portion 97 thereof and the bearing cap side portion 98 thereof, and the projecting portions 102 are respectively formed with lubricant feeding holes 59a and the spring inserting groove 46a in their inside portions such that the lubricant feeding hole 59a and the spring inserting groove 46a are concentrically located. The big end portion 97 of the connecting rod 96 and the bearing cap 98 are respectively provided with spring inserting grooves 46b and lubricant feeding holes 59b which are respectively aligned with the spring inserting grooves 46a and the lubricant feeding holes 59a which are both located in the movable bushings 51a. The pressure springs 53 are fitted in the spring inserting grooves 46a and 46b, and a lubricant is fed from the lubricant holes 42a to the outer circumferential surfaces of the movable bushings 51a though the lubricant feeding holes 59a and 59b.

Also, the bearing cap 98 and the big end portion 97 of the connecting rod 96 are provided with engaging recessed portions 103 so that the projecting portions 102 of the movable bushings are meshed with the engaging recessed portions 103.

The foregoing several preferred embodiments of the backlash absorbing mechanism for bearings which is provided according to the present invention have been described with reference to application of this system to the wire connectors in a negative type weaving machine, the leverage means in a positive type weaving machine, and the connecting rod in an automobile or marine engine. However, it will be readily understood by those skilled in the art that the backlash absorbing system of the present invention can be used with many other types machines or applications in which the shafting and the bearing are used in combination.

As is apparent from the foregoing description, the bearing system of the present invention is free from any risk of a backlash relative to shafting rotatably supported thereon, which on the other hand, inevitably occurs in the conventional type bearings. The backlash between the shafting and the bearing which supports the shafting causes their wear or abrasion to be accelerated. However, since the bearing system of the present invention does not introduce any backlash between this bearing system and the shafting which rests thereon, this bearing system does not cause any accelerative wear or abrasion of the journal portion of the shafting and the shafting supporting portion of the bearing.

The bearing system according to the first preferred embodiment of the present invention comprises the fixed bushing, the movable bushing, and the springs which allow the movable bushing to approach the fixed bushing. In this case, the fixed bushing is secured in the bearing inserting aperture such that it is located more adjacently than the supporting shaft to a portion of the bearing system on which external force acts. Also, the movable bushing is disposed to hold the supporting shaft with the aid of the fixed bushing, and is arranged to be moved in the direction of the fixed bushing. Such an arrangement allows the fixed bushing to sufficiently receive external force which is exerted upon the bearing system.

Also, in the bearing system according to the present invention, the lubricant supply bushing is located between the fixed bushing and the movable bushing or between both movable bushings, the lubricant supply bushing is provided with the lubricant feeding hole which extends downwardly from the bottom thereof to feed a lubricant to the outer circumferential surface of the supporting shaft, the attaching member having the bearing inserting aperture formed therein is provided with the lubricant hole which feeds a lubricant to the lubricant feeding hole extending downwardly from the bottom of the lubricant supply bushing, and the inner peripheral surfaces of the fixed bushing and the movable bushing are respectively formed with the lubricant guiding groove along them to direct along them the lubricant supplied from the downwardly extending lubricant feeding hole of the lubricant supply bushing. This arrangement achieves the satisfactory lubrication of the outer circumferential surface of the shaft as well as the inner peripheral surfaces of the fixed bushing and the movable bushing.

The foregoing lubricant guiding grooves are also arranged to be ramified into two side grooves. This arrangement ensures an axially wider range of lubrication to the outer circumferential surface of the supporting shaft and the inner circumferential surface of the bearing system.

Although the present invention has been fully described by way of examples with reference to the accompanying drawings, it is to be noted here that various changes and modifications will be apparent to those skilled in the art. Therefore, unless otherwise such changes and modifications depart from the scope of the present invention, they should be construed as being included therein.

I claim:

1. A backlash absorbing system in a bearing system for a shaft, comprising:
   an attaching member defining a bearing inserting aperture therein;
   a fixed bushing fixed within said bearing inserting aperture;
   a moveable bushing movably mounted within said bearing inserting aperture and cooperating with said fixed bushing to hold the shaft therebetween; and at least one spring mounted between said moveable bushing and said attaching member biasing said moveable bushing toward the shaft;

wherein each of said fixed and moveable bushings has an inner circumferential surface for engagement with the shaft, each said inner circumferential surface having opposite circumferentially spaced ends and a lubricant guiding groove therein beginning at one said end and ending before reaching the opposite said end of its respective said inner circumferential surface; and wherein said attaching member has means for supplying a lubricant to said lubricant guiding grooves.

2. The backlash absorbing system of claim 1, wherein said at least one spring comprises a compression spring disposed between said moveable bushing and an interior surface of said attaching member defining said bearing inserting aperture.

3. The backlash absorbing system of claim 1, wherein said moveable bushing has an end portion having an engaging member engaged therewith, said at least one spring comprising a tension spring being provided between said engaging member and said attaching member for drawing said moveable bushing toward said fixed bushing.

4. The backlash absorbing system of claim 1, wherein said at least one spring comprises a plate spring surrounding the outer peripheral surfaces of said fixed bushing and said moveable bushing.

5. The backlash absorbing system of any one of claims 1 to 4, wherein said means for supplying a lubricant to said lubricant guiding grooves comprises a lubricant supply bushing between said fixed bushing and said moveable bushing in said bearing inserting aperture, a lubricant feeding hole in said lubricant supply bushing communicating with said lubricating guiding grooves, and a lubricant hole in said attaching member communicating with said lubricant supply bushing.

6. The backlash absorbing system of claim 5, wherein said lubricant supply bushing has a lubricant retainer therein.

7. The backlash system of claim 1, wherein said moveable bushing has an engaging member engaged therewith at one end thereof and an aperture is provided in said attaching member adjacent the opposite end of said moveable bushing, said at least one spring comprising a first compression spring in said aperture engaging said opposite end and a tension spring connected between said engaging member and said attaching member.

8. The backlash system of claim 1, wherein said at least one spring comprises three compression springs disposed between said moveable bushing and said attaching member.

9. A backlash absorbing system in a bearing system for a shaft, comprising:

an attaching member defining a bearing inserting aperture therein;

first and second moveable bushings moveably mounted within said bearing inserting aperture cooperating with each other to hold the shaft therebetween;

at least one spring mounted between each said moveable bushing and said attaching member biasing said moveable bushing toward the shaft;

wherein each of said moveable bushings has an inner circumferential surface for engagement with the shaft, each said inner circumferential surface having opposite circumferentially spaced ends and a lubricant guiding groove therein beginning at one said end and ending before reaching the opposite said end of its respective said inner circumferential surface; and wherein said attaching member has means for supplying a lubricant to said lubricant guiding grooves.

10. The backlash absorbing system of claim 9, wherein said means for supplying a lubricant to said lubricant guiding grooves comprises a lubricant supply bushing between said moveable bushings in said bearing inserting aperture, a lubricant feeding hole in said lubricant supply bushing communicating with said lubricant guiding grooves, and a lubricant hole in said attaching member communicating with said lubricant supply bushing.

11. The backlash absorbing system of claim 9, wherein said lubricant supply bushing has a lubricant retainer therein.

12. The backlash system of claim 9, wherein said at least one spring comprises three compression springs disposed between each said moveable bushing and said attaching member.

13. The backlash absorbing system of claim 1 or 9, wherein at least one said lubricant guiding groove is ramified centrally along the longitudinal circumferential extent thereof.

* * * * *